(12) United States Patent
Kobayashi et al.

(10) Patent No.: US 11,642,791 B2
(45) Date of Patent: May 9, 2023

(54) AUTONOMOUS MOBILE ROBOT AND CONTROL PROGRAM FOR AUTONOMOUS MOBILE ROBOT

(71) Applicants: National University Corporation Shizuoka University, Hamamatsu (JP); National University Corporation, Iwate University, Morioka (JP); Toyota Jidosha Kabushiki Kaisha, Aichi-Ken (JP)

(72) Inventors: Yuichi Kobayashi, Hamamatsu (JP); Takeshi Sugimoto, Tokyo-to (JP); Chyon Hae Kim, Morioka (JP); Kazuhito Tanaka, Toyota (JP)

(73) Assignees: NATIONAL UNIVERSITY CORPORATION SHIZUOKA UNIVERSITY, Hamamatsu (JP); NATIONAL UNIVERSITY CORPORATION IWATE UNIVERSITY, Morioka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 17/064,006

(22) Filed: Oct. 6, 2020

(65) Prior Publication Data
US 2021/0101293 A1    Apr. 8, 2021

(30) Foreign Application Priority Data

Oct. 8, 2019    (JP) .............................. JP2019-185159

(51) Int. Cl.
*B25J 9/16* (2006.01)
*B25J 13/08* (2006.01)
*B25J 9/00* (2006.01)

(52) U.S. Cl.
CPC ........... *B25J 13/089* (2013.01); *B25J 9/0081* (2013.01); *B25J 9/163* (2013.01); *B25J 9/1666* (2013.01); *B25J 9/1671* (2013.01)

(58) Field of Classification Search
CPC ........ B25J 13/089; B25J 9/0081; B25J 9/163; B25J 9/1666; B25J 9/1671; B25J 5/007;
(Continued)

(56) References Cited

U.S. PATENT DOCUMENTS 9,776,323 B2 * 10/2017 O'Sullivan .............. B25J 9/163
10,310,506 B1 * 6/2019 Qi .......................... A45C 13/28
(Continued)

FOREIGN PATENT DOCUMENTS

| CN | 110162063 A | * | 8/2019 | |
| JP | 2014-123348 A | | 7/2014 | |
| WO | WO-2019237990 A1 | * | 12/2019 | ............ B25J 13/089 |

*Primary Examiner* — Adam R Mott
*Assistant Examiner* — Sagar Kc
(74) *Attorney, Agent, or Firm* — Dinsmore & Shohl LLP

(57) ABSTRACT

An autonomous mobile robot includes a first arithmetic unit configured to calculate a course direction based on an own position, a moving-object position, and a moving-object velocity vector, the course direction being a direction in which the autonomous mobile robot should travel, a second arithmetic unit configured to input the own position, the moving-object position, the moving-object velocity vector, and the course direction into a trained model and thereby calculate an estimated position, the trained model being a model that has been trained, the estimated position being a position at which the autonomous mobile robot is estimated to arrive a predetermined time later without colliding with the moving object, a generating unit configured to generate a remaining route from the estimated position to a destination, and a movement control unit configured to control a movement to the destination based on the course direction and the remaining route.

8 Claims, 11 Drawing Sheets

(58) Field of Classification Search
CPC ..... B25J 9/1676; B25J 9/1664; G05D 1/0246;
G05D 1/024; G05D 1/0221; G05D
1/0251; G05D 1/0259; G05D 1/0276;
G05D 1/0289; G05B 2219/39091; G05B
2219/40475; G01C 21/00
See application file for complete search history.

(56) References Cited

U.S. PATENT DOCUMENTS

| | | | |
|---|---|---|---|
| 11,016,491 B1* | 5/2021 | Millard | G05D 1/0274 |
| 11,338,438 B2* | 5/2022 | Ha | B25J 9/1653 |
| 11,340,621 B2* | 5/2022 | Cheon | G05D 1/0238 |
| 11,409,295 B1* | 8/2022 | Samdaria | G05D 1/0214 |
| 2012/0158178 A1* | 6/2012 | Hyung | G05D 1/0274 |
| | | | 901/46 |
| 2014/0039676 A1* | 2/2014 | Fernando | G05D 1/0214 |
| | | | 901/1 |
| 2014/0180526 A1* | 6/2014 | Deshpande | G05D 1/0248 |
| | | | 701/25 |
| 2018/0361577 A1* | 12/2018 | Williams | B25J 9/1664 |
| 2019/0161274 A1* | 5/2019 | Paschall, II | G05D 1/0246 |
| 2019/0384320 A1* | 12/2019 | Lee | B60W 60/001 |
| 2020/0201340 A1* | 6/2020 | Cho | G05D 1/0214 |
| 2020/0310444 A1* | 10/2020 | Hasegawa | G06N 3/008 |

* cited by examiner

| MOVEMENT PERFORMANCE | OMNIDIRECTION-TYPE<br>VELOCITY: -1~1.5m/s, -90~90deg/s<br>ACCELERATION: -1~1m/s$^2$, -90~90deg/s$^2$ |
|---|---|
| SENSOR:LFR<br>(Laser Range Finder) | VIEWING ANGLE: 240deg<br>RANGE: 0.1~30m<br>RESOLUTION: 0.25deg |
| KEEP ENVIRONMENT MAP<br>RECOGNIZE OWN POSITION ON MAP ||

AUTONOMOUS MOBILE ROBOT AND CONTROL PROGRAM FOR AUTONOMOUS MOBILE ROBOT

CROSS REFERENCE TO RELATED APPLICATIONS

This application is based upon and claims the benefit of priority from Japanese patent application No. 2019-185159, filed on Oct. 8, 2019, the disclosure of which is incorporated herein in its entirety by reference.

BACKGROUND

The present disclosure relates to an autonomous mobile robot and a control program for an autonomous mobile robot.

A technique for enabling each of a plurality of autonomous mobile robots to perform a respectively given task under a certain environment has become known. For example, a technique in which a plurality of cleaning robots perform cleaning while moving along mutually different routes is known. Further, a technique for moving a moving object while preventing it from colliding with a moving obstacle is known (see, for example, Japanese Unexamined Patent Application Publication No. 2014-123348).

SUMMARY

When a task is carried out in an environment in which people and autonomous mobile robots coexist, it is necessary to prevent autonomous mobile robots from colliding not only with other autonomous mobile robots but also with people. However, in a crowded environment such as in a train station or in an airport, autonomous mobile robots have to avoid (i.e., steer around) a number of moving objects such as pedestrians and hence their autonomous movements are very difficult. In particular, when there are a number of moving objects that the mobile robot has to avoid, the mobile robot, which tries to avoid them, continuously deviates from the original moving route to the destination, thus making it difficult to update the moving route in real time.

The present disclosure has been made in order to solve such a problem and an object thereof is to provide an autonomous mobile robot capable of smoothly moving to a set destination even in a densely crowded environment.

A first exemplary aspect is an autonomous mobile robot including: a determination unit configured to determine an own position of the autonomous mobile robot; a detection unit configured to detect a moving-object position and a moving-object velocity vector of a moving object moving in the vicinity of the autonomous mobile robot; a first arithmetic unit configured to calculate a course direction based on the own position, the moving-object position, and the moving-object velocity vector, the course direction being a direction in which the autonomous mobile robot should travel; a second arithmetic unit configured to input the own position, the moving-object position, the moving-object velocity vector, and the course direction into a trained model and thereby calculate an estimated position, the trained model being a model that has been trained by learning performed by a simulation using a teacher, the estimated position being a position at which the autonomous mobile robot is estimated to arrive a predetermined time later without colliding with the moving object; a generation unit configured to generate a remaining route from the estimated position to a destination; and a movement control unit configured to control a movement to the destination based on the course direction and the remaining route. According to the autonomous mobile robot having the above-described configuration, even when the autonomous mobile robot deviates from the planned moving route because it has avoided (i.e., steered around) a moving object(s), the autonomous mobile robot can immediately update the moving route and smoothly move to the destination. Further, the above-described autonomous mobile robot may update the estimated position and the remaining route when the detection unit newly detects a moving object that satisfies a predefined condition during the movement to the destination. By the above-described configuration, the autonomous mobile robot can quickly update the moving route.

Further, in the above-described autonomous mobile robot, the first arithmetic unit may calculate a plurality of candidate course directions. The second arithmetic unit may calculate an estimated position for each of the plurality of course directions calculated by the first arithmetic unit. The generation unit may generate a remaining route for each of the plurality of estimated positions calculated by the second arithmetic unit, perform evaluation calculation for each of the generated remaining routes, and determine the course direction and the remaining route that are passed to the movement control unit. Since the calculation of the estimated position using the trained model can be performed at a high speed, the movement is not delayed even when the number of candidates of the course direction is increased. Therefore, it is possible to determine a better moving route by examining a plurality of course directions. In this process, the trained model may also output a degree of closeness to the moving object during the movement along the route to the estimated position, and the generation unit may perform the evaluation calculation by using the degree of closeness. By the above-described configuration, it is possible to determine the moving route while adjusting a balance between intimidation given to the pedestrian and the efficient movement.

Further, in the above-described autonomous mobile robot, the first arithmetic unit may calculate the course direction based on an evaluation function, the evaluation function including, as evaluation items, a fact that a distance from the moving object is long and a fact that the autonomous mobile robot follows a moving direction of the moving object. It is possible to adopt, as a smooth course in which the autonomous mobile robot does not collide with the moving object, not only the direction in which the autonomous mobile robot is away from the moving object, which the autonomous mobile robot should avoid, but also the direction in which the autonomous mobile robot follows the movement of the moving object. In this process, the first arithmetic unit may calculate the course direction while taking a direction to the destination into consideration. By determining the course direction in this way, it is expected that the time required to arrive at the destination can be reduced.

A second exemplary aspect is a non-transitory computer readable medium storing a control program for controlling an autonomous mobile robot, the control program causing a computer to execute: a detection step of detecting a moving-object position and a moving-object velocity vector of a moving object moving in the vicinity of the autonomous mobile robot; a determination step of determining an own position of the autonomous mobile robot when the moving object that satisfies a predefined condition is detected in the detection step performed during a movement to a destination; a first calculation step of calculating a course direction based on the own position, the moving-object position, and the moving-object velocity vector, the course direction being a direction in which the autonomous mobile robot should travel; a second calculation step of inputting the own position, the moving-object position, the moving-object velocity vector, and the course direction into a trained model and thereby calculating an estimated position, the trained model being a model that has been trained by learning performed by a simulation using a teacher, the estimated position being a position at which the autonomous mobile robot is estimated to arrive a predetermined time later without colliding with the moving object; a generating step of generating a remaining route from the estimated position to the destination; and a movement control step of controlling the movement to the destination based on the course direction and the remaining route. According to the autonomous mobile robot controlled by the above-described control program, even when the autonomous mobile robot deviates from the planned moving route because it has avoided a moving object(s), the autonomous mobile robot can immediately update the moving route and smoothly move to the destination.

According to the present disclosure, it is possible to provide an autonomous mobile robot capable of smoothly moving to a set destination even in a densely crowded environment.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through embodiments of the present disclosure. However, they are not intended to limit the scope of the present disclosure according to the claims. Further, all of the components/structures described in the embodiments are not necessarily indispensable as means for solving the problem.

Figure 1:
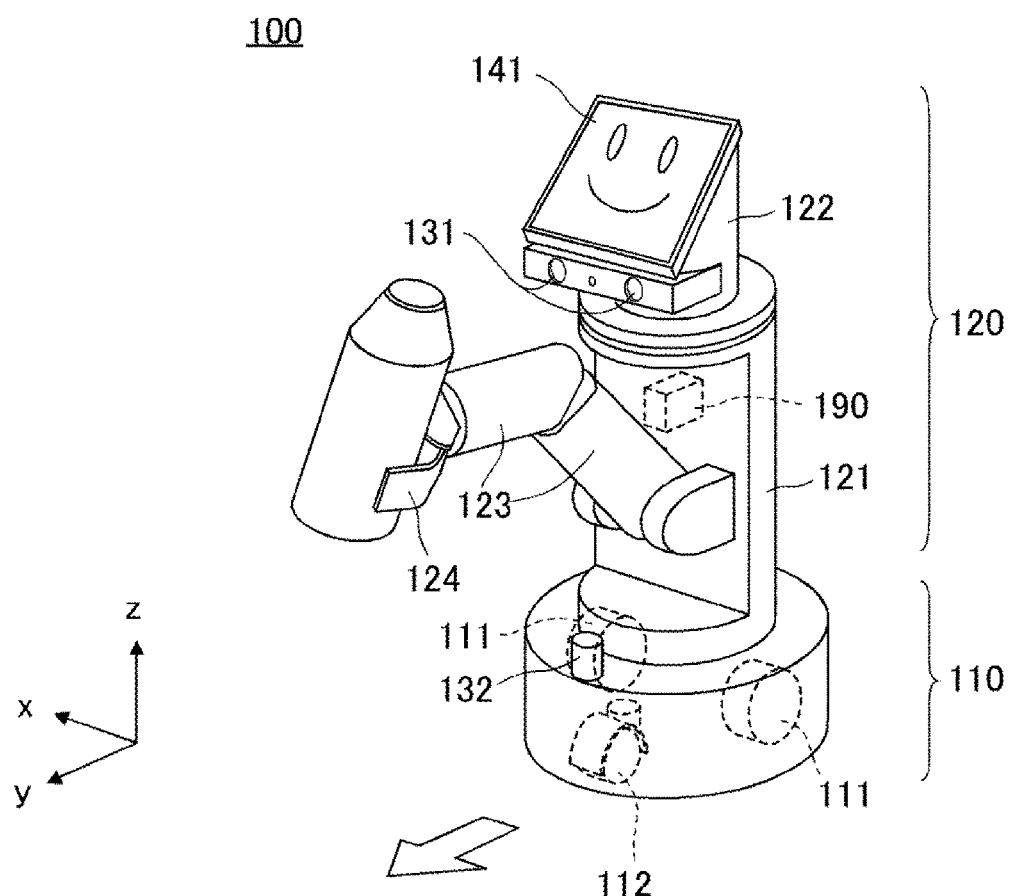
FIG. 1 is a perspective view of an external appearance of an autonomous mobile robot according to an embodiment.

FIG. 1 is a perspective view of an external appearance of an autonomous mobile robot 100 according to this embodiment. The mobile robot 100 is an example of an autonomous mobile robot that autonomously moves to a set destination. The mobile robot 100 includes, mainly, a movable base part 110 and a main-body part 120.

The movable base part 110 supports two driving wheels 111 and one caster 112, each of which is in contact with a traveling surface, inside its cylindrical housing. The two driving wheels 111 are arranged so that the centers of their rotation axes coincide with each other. Each of the driving wheels 111 is rotationally driven by a motor (not shown) independently of each other. The driving wheels 111 are an example of a movement unit for moving the mobile robot. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110.

For example, when the two driving wheels are rotated in the same direction at the same rotational speed, the mobile robot 100 moves straight, whereas when the two driving wheels 111 are rotated in directions opposite to each other at the same rotational speed, the driving wheels 111 rotate around a vertical axis passing through roughly the center of the two driving wheels of the movable base part 110. That is, the mobile robot 100 can move straight and rotate in an arbitrary direction by controlling the rotational direction and rotational speed of each of the two driving wheels 111. Further, the mobile robot 100 can also control the relative rotation (the direction or the speed) between its trunk part 121 and the movable base part 110, and can also move straight and rotate while continuously facing in an arbitrary direction.

The movable base part 110 includes a laser scanner 132 in a peripheral part of its top surface. The laser scanner 132 scans a certain range on the horizontal plane at a certain stepping angle and thereby detects an obstacle. The performance of the laser scanner 132 will be described later in detail.

The main-body part 120 includes, mainly, the trunk part 121 mounted on the top surface of the movable base part 110, a head part 122 placed on the top surface of the trunk part 121, an arm 123 supported on the side surface of the trunk part 121, and a hand 124 disposed at the tip of the arm 123. The arm 123 and the hand 124 are driven by motors (not shown) and grasp various objects in a controlled posture. FIG. 1 shows a state in which the autonomous mobile robot is grasping a container as an example of an object to be conveyed. The trunk part 121 is able to rotate around a vertical axis with respect to the movable base part 110 by a driving force of a motor (not shown). Therefore, the mobile robot 100 can also move in an arbitrary direction while maintaining its posture in which the grasping part is grasping the object to be conveyed and the mobile robot faces in a specific direction. A control box 190 is provided in the trunk part 121. The control box 190 includes a control unit, a memory, etc. which are described later.

The head part 122 mainly includes a stereo camera 131 and a display panel 141. The stereo camera 131 has a configuration in which two camera units having the same angle of view are arranged away from each other, and outputs image data of images taken by the respective camera units. The stereo camera 131 recognizes an object to be grasped, assists the laser scanner 132, and so on.

The display panel 141 is, for example, a liquid crystal display panel, and displays a face of a character as an illustration and displays information about the mobile robot 100 in the form of text or by using icons. By displaying the face of the character on the display panel 141, it is possible to give an impression as if the display panel 141 is a pseudo face part to people who are present around and see the mobile robot 100. Further, the display panel 141 is equipped with a touch panel on its display surface, so that it can receive an instruction input from a user. For example, when it is desired to make the mobile robot 100 guide a user to a specific place, the user selects a menu item corresponding to that task by operating the touch panel.

The head part 122 is able to rotate around a vertical axis and around a horizontal axis with respect to the trunk part 121 by a driving force(s) of a motor(s) (not shown). Therefore, the stereo camera 131 can shoot (e.g., photograph) an object located in an arbitrary direction. Further, the display panel 141 can show displayed contents in an arbitrary direction. Note that in the following description, as shown in the drawings, a moving plane in which the mobile robot 100 moves is defined as an xy-plane and a vertical-axis direction with respect to the moving plane is defined as a z-axis.

Figure 2:
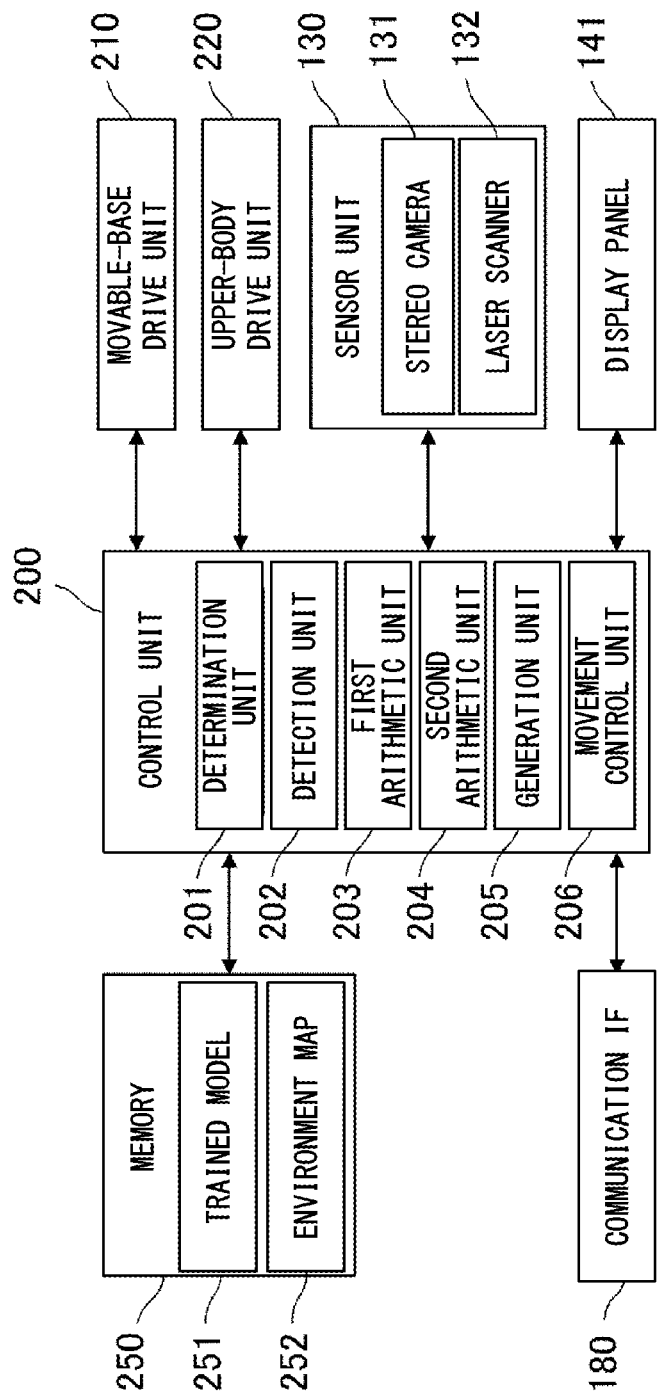
FIG. 2 shows a system configuration of a mobile robot.

FIG. 2 shows a system configuration of the autonomous mobile robot 100. A control unit 200 is, for example, a CPU (Central Processing Unit) and is stored in, for example, the control box 190 disposed in the main-body part 120. A movable-base drive unit 210 includes a driving circuit and a motor(s) for driving the drive wheels 111. An upper-body drive unit 220 includes driving circuits and motors for driving a grasping part including the arm 123 and the hand 124, the trunk part 121, and the head part 122.

A sensor unit 130 includes various sensors for detecting other mobile robots, obstacles, people present in the vicinity of the autonomous mobile robot, an object that is grasped by the mobile robot and will be conveyed, and so on. Further, these sensors are disposed in the movable base part 110 and the main-body part 120 in a distributed manner. The stereo camera 131 and the laser scanner 132 are components included in the sensor unit 130.

A memory 250 is a nonvolatile storage medium. For example, a solid-state drive is used for the memory 250. The memory 250 stores, in addition to a control program for controlling the movement, the grasping action, and the like of the mobile robot 100, various parameter values, functions, lookup tables, etc. used for the control and the calculation. In particular, the memory 250 stores a trained model 251 (which will be described later) and an environment map 252 in which an environment where the autonomous mobile robot autonomously moves is described.

The communication IF 180 is an interface for connecting to an external apparatus, and includes, for example, a wireless LAN unit for exchanging data with a server (not shown) connected to a network. The mobile robot 100 acquires the trained model 251, the environment map 252, and the like from the server through the communication IF 180.

The control unit 200 performs overall control of the mobile robot 100 and various calculation processes by executing a control program loaded from the memory 250. Further, the control unit 200 also functions as a function execution unit that performs various controls and various calculations related to the control. As the function execution unit, the autonomous mobile robot includes a determination unit 201, a detection unit 202, a first arithmetic unit 203, a second arithmetic unit 204, a generation unit 205, and a movement control unit 206.

By using the output of the sensor unit 130 and the environmental map 252, the determination unit 201 determines the own position, i.e., the current position of the mobile robot 100. The detection unit 202 detects a moving-object position and a moving-object velocity vector of a moving object moving in the vicinity of the autonomous mobile robot by mainly using the output of the laser scanner 132.

The first arithmetic unit 203 calculates a course direction, which is a direction in which the mobile robot 100 should travels, from the own position determined by the determination unit 201, and the moving-object position and the moving-object velocity vector detected by the detection unit 202. The second arithmetic unit 204 inputs the own position determined by the determination unit 201, the moving-object position and the moving-object velocity vector detected by the detection unit 202, and the course direction calculated by the first arithmetic unit 203 into the trained model 251, and thereby calculates an estimated position, i.e., a position at which the autonomous mobile robot is estimated to arrive a predetermined time later without colliding with the moving object.

The generation unit 205 generates a remaining route, i.e., a route from the estimated position calculated by the second arithmetic unit 204 to the destination. The movement control unit 206 controls the movable-base drive unit 210 based on the course direction calculated by the first arithmetic unit 203 and the remaining route generated by the generation unit 205 so that the autonomous mobile robot moves to the destination. Details of each function execution unit will be described later.

Figure 3:
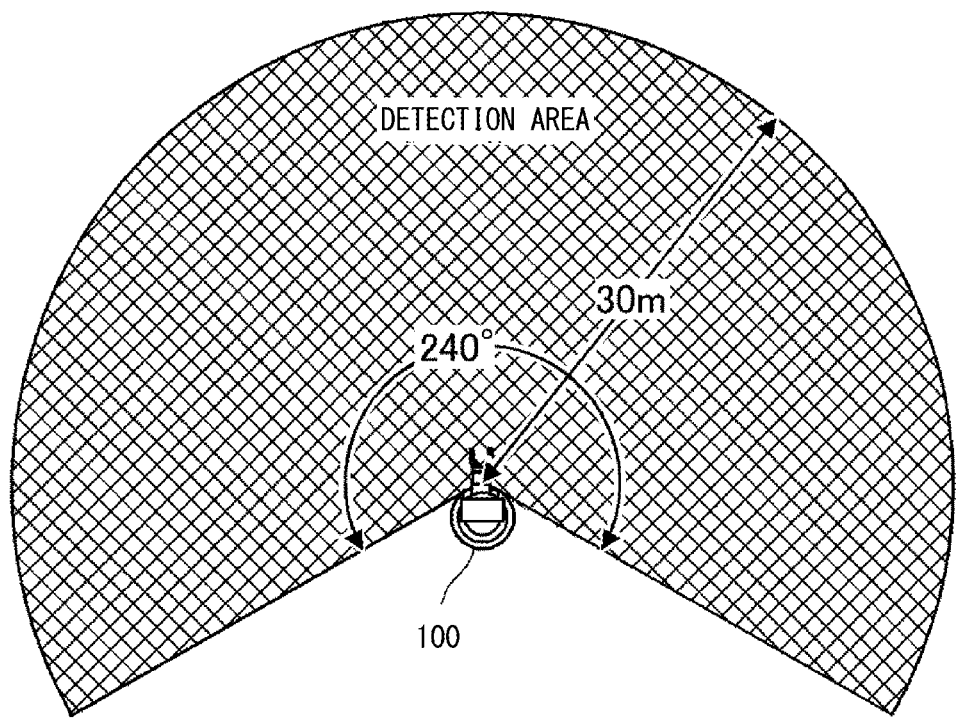
FIG. 3 is a diagram and a table for explaining expected performance of a mobile robot.

FIG. 3 is a diagram and a table for explaining expected performance of the autonomous mobile robot 100 according to this embodiment. As described above, the mobile robot 100 can move in any direction by performing the independent two wheel driving and the rotation of the trunk part. The movement control unit 206 controls the mobile robot 100 so that it moves at a velocity of −1 to 1.5 m/s and a rotational angular velocity of −90 to 90 deg/s. The laser scanner 132, which is a laser range finder, can detect an obstacle in a detection area of which a forward viewing angle is 240° and a distance is 30 m at maximum by continuously performing scanning at a stepping angle of 0.25°. The detection unit 202 obtains (i.e., receives) the output of the laser scanner 132 and detects the position of the obstacle (i.e., relative coordinates of the obstacle with respect to the reference position of the mobile robot 100, which is used as the origin of the coordinate system). Further, the detection unit 202 detects (i.e., determines) whether or not the obstacle is moving by continuously obtaining the output. Further, when the obstacle is moving, the detection unit 202 recognizes the obstacle as a moving object and detects the position (a moving-object position) and the velocity (a moving-object velocity vector) of the moving object at that time point.

Further, the determination unit 201 determines the current place (the own position) of the mobile robot 100 by obtaining the output of the laser scanner 132 and the output of the stereo camera 131, detecting a structure(s) (e.g., a pillar(s), a wall(s), a shelf(s), etc.) in the environment, and comparing a result of the detection with the environment map 252. Note that the determination unit 201 may use information about the rotations of the drive wheels 111, signals from sensors installed in the environment, and so on.

Figure 4:
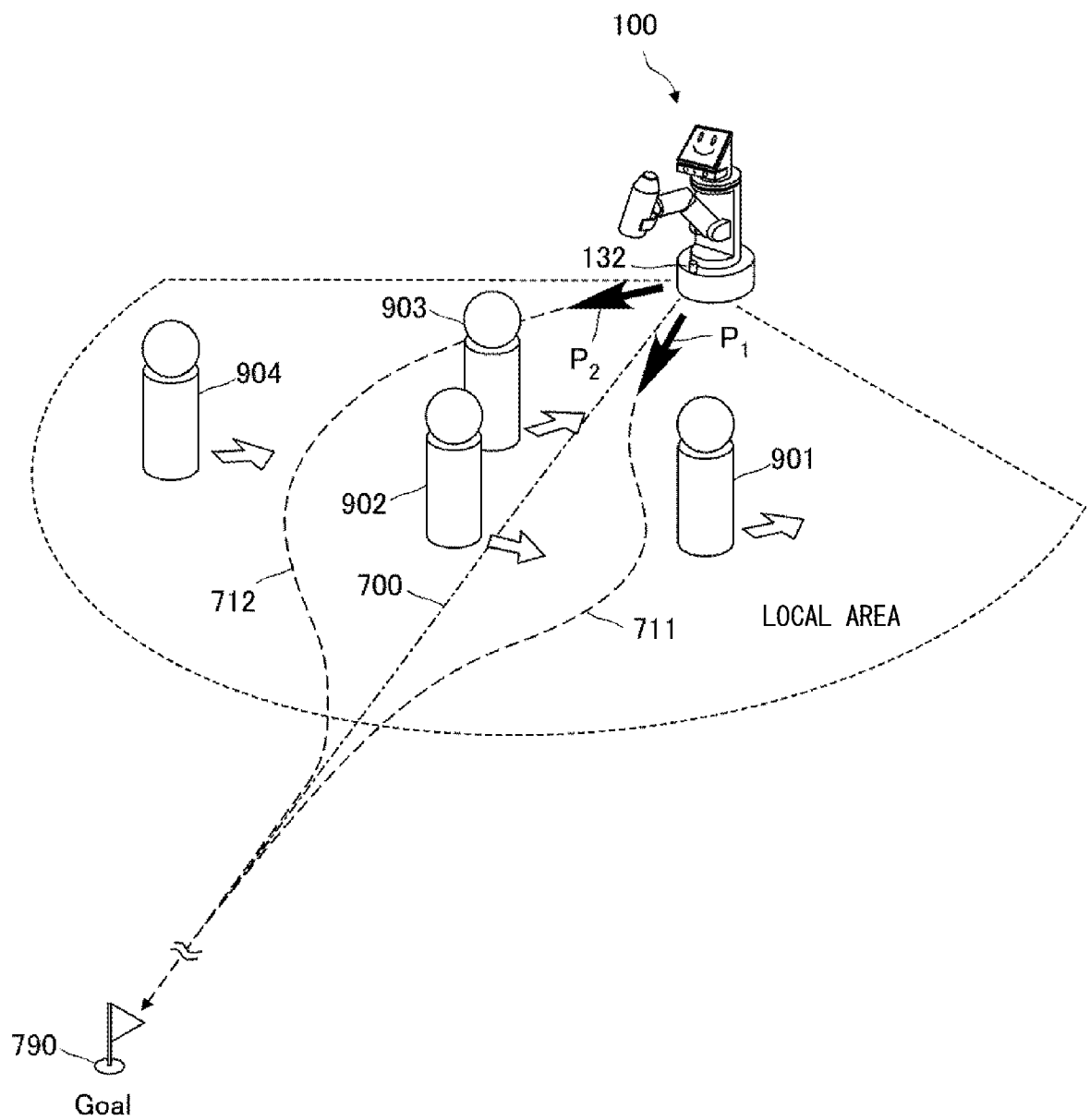
FIG. 4 is a conceptual diagram for explaining an autonomous movement to a destination while avoiding pedestrians.

FIG. 4 is a conceptual diagram for explaining an autonomous movement to a destination while avoiding pedestrians. Examples of the environment in which the mobile robot 100 autonomously moves include an environment in which people and mobile robots coexist, and also include a public space such as a train station or an airport which could be densely crowded with pedestrians. In such environments, the mobile robot 100 performs various tasks such as guiding a person who has lost his/her way and conveying an object to be conveyed.

Unlike the structures such as pillars and walls, pedestrians cannot be described (e.g., depicted) in the environmental map 252. Therefore, the mobile robot 100 performs an avoiding action every time it detects a pedestrian who is likely to collide with the mobile robot itself. Note that examples of the moving object may include, in addition to the pedestrians, a hand cart, personal mobility, other moving robots, etc. However, the following description is given by using pedestrians as examples of the moving object.

When the mobile robot 100 detects pedestrians 901 to 904 by the laser scanner 132 while moving along a planned route 700 to a destination 790 which is planned at the start of the execution of the task, it determines whether or not there is a possibility that these pedestrians collide with the mobile robot itself. Specifically, the mobile robot 100 recognizes, as a target pedestrian who could possibly collide with the mobile robot itself, a pedestrian who is present in a local area set in the traveling direction of the mobile robot itself and has a velocity vector at which that pedestrian will not goes out of the local area within a certain time. The local area is set as an area narrower than the detection area. Note that the conditions for determining the target pedestrian are set in advance in accordance with the characteristics of the environment in which the mobile robot 100 autonomously moves, the performance of the mobile robot 100, and so on.

When the pedestrians 901 to 904 are present in positions indicated in FIG. 4 and are moving at velocity vectors indicated by hollow arrows, the mobile robot 100 may select (i.e., plan) course directions indicated by black arrows $P_1$ and $P_2$. In the case of the course direction indicated by the black arrow $P_1$, the mobile robot may generate an avoiding route 711 along which the mobile robot avoids the pedestrian 901 to 903 by first moving toward a gap space formed between the pedestrian 901 and the pedestrians 902 and 903, and then moving so as to somewhat follow the movement of the pedestrian 901. In the case of the course direction indicated by the black arrow P2, the mobile robot may generate an avoiding route 712 along which the mobile robot avoids the pedestrian 902 to 904 by moving toward a relatively large space formed between the pedestrians 902 and 903 and the pedestrian 904. In this embodiment, when the mobile robot 100 determines (i.e., plans) the course direction indicated by the black arrow, it estimates a position at which the mobile robot 100 will arrive a predetermined time later and generates a remaining route from the estimated position to the destination 790 in advance, so that the mobile robot 100 can smoothly reach the destination 790.

Figure 5:
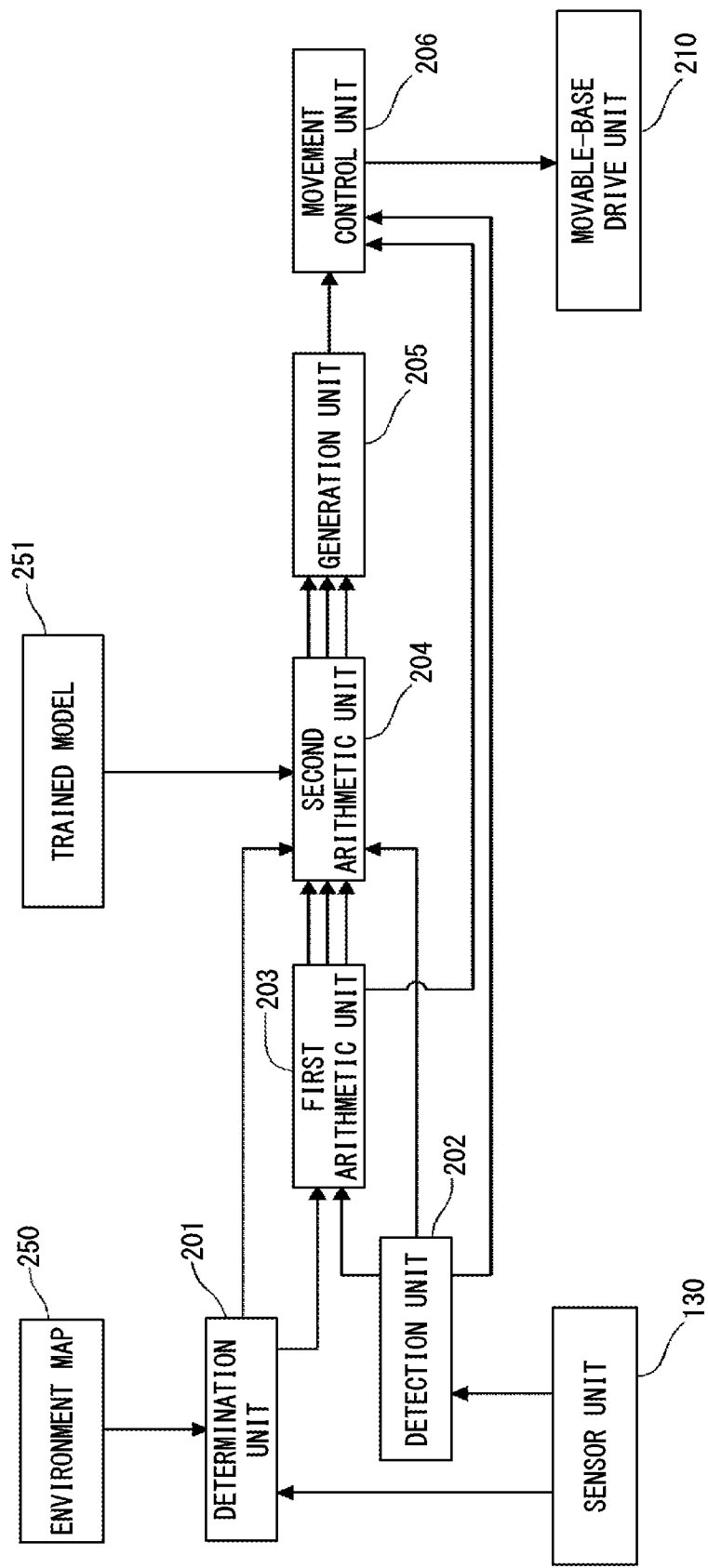
FIG. 5 is a functional block diagram showing process flows.

FIG. 5 is a functional block diagram showing process flows. Each functional block corresponds to a respective one of the elements in the system configuration described above with reference to FIG. 2. The output of the sensor unit 130 is supplied to the determination unit 201 and the detection unit 202. The determination unit 201 determines the own position (i.e., the position of the mobile robot) by comparing the output of the sensor unit 130 with the environment map 252 read from the memory 250. The information about the determined own position is passed to the first and second arithmetic units 203 and 204.

The detection unit 202 obtains the output of the sensor unit 130 and detects positions and velocity vectors of pedestrians. The information about the detected positions and velocity vectors of the pedestrians is passed to the first and second arithmetic units 203 and 204 and the movement control unit 206. The first arithmetic unit 203 obtains the information about the own position and the information about the positions and the velocity vectors of the pedestrians, and calculates a candidate(s) for the course direction in which the mobile robot itself should travel. A plurality of candidates may be calculated as long as they satisfy the predefined conditions. A specific calculation method will be described later. The candidate(s) of the course direction in which the mobile robot itself should travel is passed to the second arithmetic unit 204 and the movement control unit 206.

The second arithmetic unit 204 inputs the information about the own position, the information about the positions and the velocity vectors of the pedestrians, and the candidate(s) of the course direction in which the mobile robot itself should travel into the trained model 251 read from the memory 250, and thereby calculates an estimated position at which the mobile robot 100 is estimated to arrive a predetermined time later. When a plurality of candidates of the course direction in which the mobile robot should travel are obtained, an estimated position is calculated for each of the plurality of candidates. A specific calculation method will be described later. Information about the calculated estimated position(s) is passed to the generation unit 205.

The generation unit 205 obtains the information about the estimated position and generates a remaining route from the estimated position to the destination 790. When information about a plurality of estimated positions is obtained, a remaining route is generated for each of the plurality of estimated positions. When a plurality of remaining routes are generated, one remaining route is determined (i.e., selected) by performing evaluation calculation for each of the plurality of remaining routes. A specific calculation method will be described later. Information about the generated and determined remaining route is passed to the movement control unit 206.

The movement control unit 206 obtains the information about the determined remaining route, the course direction corresponding to that remaining route, and the positions and velocity vectors of the pedestrians, and moves the mobile robot 100 by controlling the movable-base drive unit 210 based on the obtained information. Specifically, the mobile robot starts moving in the obtained course direction, and continues traveling while avoiding pedestrians based on the information about the positions and the velocity vectors of the pedestrians until a predetermined time, for which the estimated position has been calculated, has elapsed. Then, after the predetermined time has elapsed, the mobile robot performs movement control so as to move along the remaining route.

In this process, the detection unit 202 periodically detects positions and velocity vectors of pedestrians, and passes a result of the detection to the movement control unit 206. The movement control unit 206 performs an avoiding action according to the detected situation. Therefore, in some cases, the mobile robot may not reach the estimated position, which is the start point of the remaining route, after the predetermined time. However, in such cases, the mobile robot promptly corrects the actual path so as to conform to the remaining route after the predetermined time has elapsed.

Further, when the mobile robot found a new target pedestrian before the predetermined time elapses after starting the movement in the course direction, or when the mobile robot finds a new target pedestrian after starting the movement along the remaining route, it updates the estimated position and the remaining route by performing the series of processes again. When the mobile robot updates the estimated position and the remaining route, it starts moving in the course direction corresponding to the newly estimated position.

Figure 6:
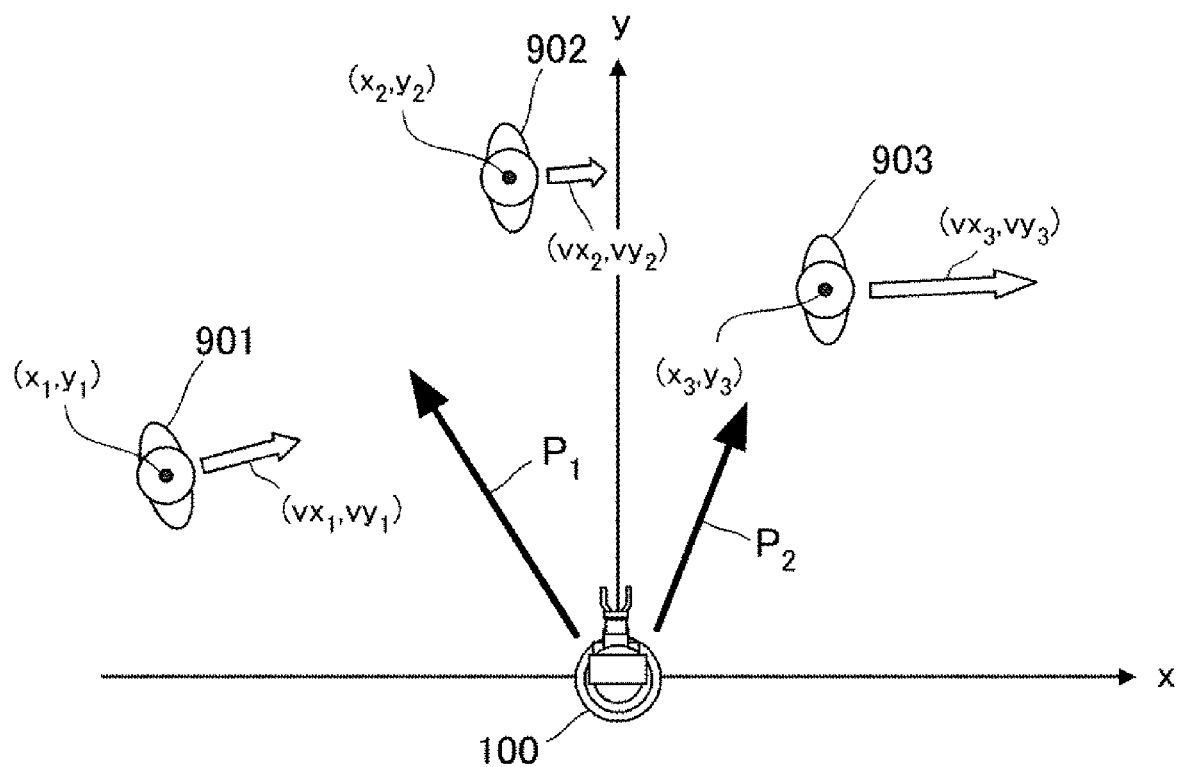
FIG. 6 is a diagram for explaining candidates for a course direction.

FIG. 6 is a diagram for explaining candidates for the course direction. As described above, the course direction is calculated by the first arithmetic unit 203. Note that it is assumed that the pedestrians 901 to 903 are present as target pedestrians as shown in FIG. 6. The first arithmetic unit 203 obtains a position $(x_1, y_1)$ and a velocity vector $(xv_1, yv_1)$ of the pedestrian 901 detected by the detection unit 202, a position $(x_2, y_2)$ and a velocity vector $(xv_2, yv_2)$ of the pedestrian 902, and a position $(x_3, y_3)$ and a velocity vector $(xv_3, yv_3)$ of the pedestrian 903.

It is desired that the course direction be set so as not to cross near a moving pedestrian. An example of calculation of the course direction will be described. The first arithmetic unit 203 calculates a one-dimensional potential from the positions and the velocity vectors of the pedestrians. Then, a direction that takes the minimum value of the calculated one-dimensional potential is defined as a candidate for the course direction. The potential of a pedestrian i is defined as follows.

[Expression 1]

$$p_i^{obs}(\phi) = \frac{A}{r_i}\exp\left\{-\frac{(\phi-\theta_i)^2}{\beta}\right\} \quad (1)$$

[Expression 2]

$$p_i^{vel}(\phi) = A\frac{v_h}{(r_i+1)^2}\exp\left\{-\frac{(\phi-\theta_i)^2}{\beta}\right\} \quad (2)$$

In the expressions, $r_i$ is a distance from the mobile robot 100 to the pedestrian I; $\varphi$ is an argument of the polar coordinates in the robot coordinate system; $\varphi_g$ is a destination direction; $\theta$ is a position direction (i.e., a direction to the position) of the pedestrian i in the robot coordinate system; and $v_h$ is a component of the velocity of the pedestrian in the direction from the pedestrian toward the mobile robot 100. These parameters are calculated from the position $(x_i, y_i)$ and the velocity vector $(xv_i, yv_i)$. Further, A and β are coefficients and are adjusted in advance. The coefficient β changes according to the parameter $r_i$. For example, when B and γ are constant coefficients, their relation is expressed as β={B arctan(γ/$r_i$)}². When there are N target pedestrians, the one-dimensional potential for determining the course direction is expressed as follows.

[Expression 3]

$$P^{obs} = \sum_{i=1}^{N}p_i^{obs}(\phi) + p_g(\phi) \quad (3)$$

[Expression 4]

$$P^{vel} = \sum_{i=1}^{N}p_i^{vel}(\phi) \quad (4)$$

In the expression of $P^{obs}$, the angle φ at which the pedestrian is present becomes a peak of the potential. Therefore, the gap between pedestrians becomes a valley of the potential and can be extracted as a candidate for the course direction. Further, in the Expression (3), $p_g(\varphi)$ is defined as follows.

[Expression 5]

$$p_g(\phi) = -C\exp\left\{-\frac{(\phi-\theta_g)^2}{\beta}\right\} \quad (5)$$

In the expression, C is a coefficient. By adding only $p_g(\varphi)$, the potential in the destination direction becomes negative and hence the mobile robot 100 can select the destination direction. When the mobile robot follows a pedestrian, the position direction φ of the pedestrian who moves away from the mobile robot 100 becomes a valley of the potential. Therefore, the autonomous mobile robot 100 can follow the pedestrian who moves away from the mobile robot. For a set $H^{obs}=\{\alpha_1^{obs}, \alpha_2^{obs}, \ldots, \alpha_i^{obs}\}$ and a set $H^{vel}=\{\alpha_1^{vel}, \alpha_2^{vel}, \ldots, \alpha_i^{vel}\}$, each of which is a set of angles which are obtained as described above and at which the potential takes the minimum value, the union of the set $H^{obs}$ and the set $H^{vel}$ becomes candidates for the course direction. The example shown in FIG. 6 shows a state in which black arrows $P_1$ and $P_2$ are calculated as $H^{obs}$ and $H^{vel}$, respectively.

Figure 7:
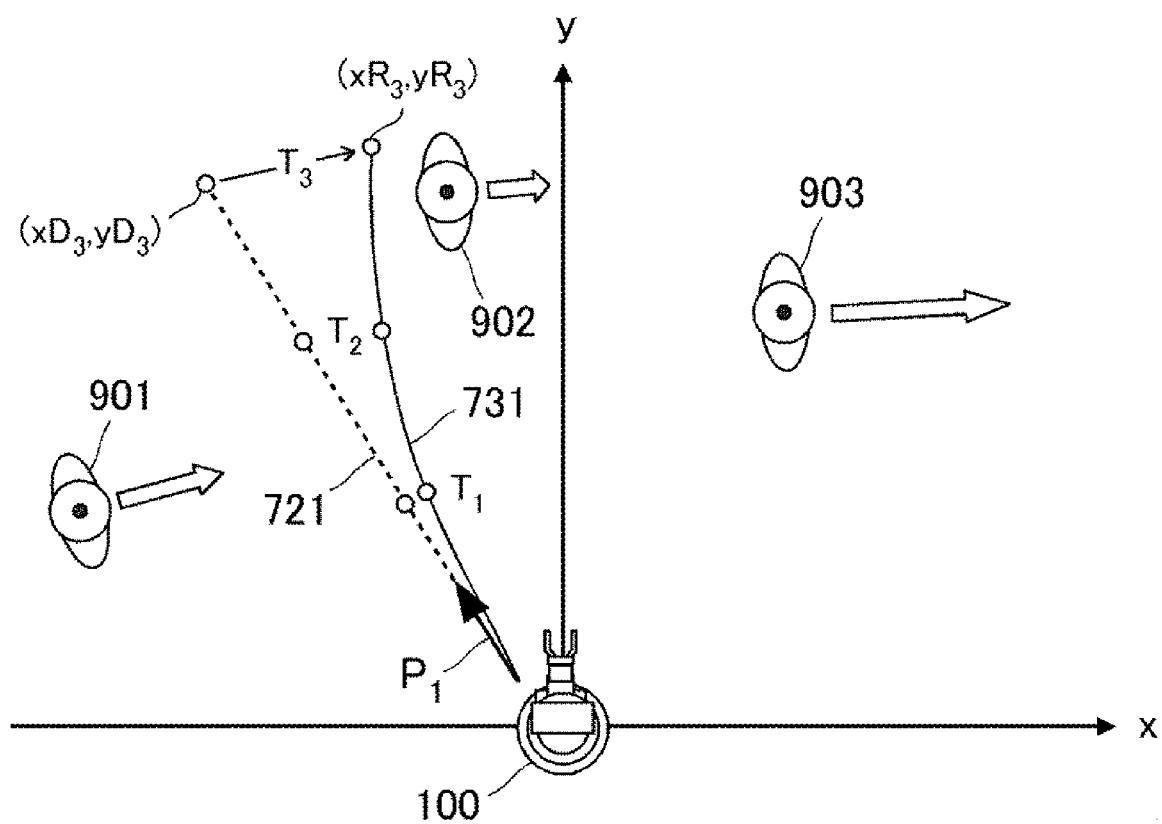
FIG. 7 is a diagram showing a state in which a course is shifted due to an influence of a pedestrian.

For example, there are many cases where even though the mobile robot 100 determines the direction indicated by the black arrow $P_1$ as the course direction and starts moving, it cannot actually continue the movement in the straight direction due to a collision avoiding action that the mobile robot 100 has performed for the movement of a pedestrian and hence the actual movement is deviated from the straight direction. FIG. 7 is a diagram showing a state in which the course is shifted due to an influence of a pedestrian.

The planned route 721 indicated by a dotted line indicates a trajectory in the case where the mobile robot moves straight as planned, i.e., moves straight in the direction indicated by the black arrow $P_1$ determined as the course direction. An actual route 731 indicated by a solid line indicates a trajectory along which the mobile robot 100 has actually moved. Circles on each trajectory indicate positions at intervals of a unit time Δt.

FIG. 7 shows a fact that: although the mobile robot 100 has tried to move along the planned route 721, it has adopted a route by which the mobile robot has tried to prevent it from moving closer to the pedestrian 901 as much as possible; and as a result, the mobile robot deviates from the planned route 721 and has moved along the trajectory of the actual route 731. Further, FIG. 7 shows that: at a time $T_3$, i.e., 3×Δt later, the mobile robot should have reached a position $(xD_3, yD_3)$ if it had traveled along the planned route 721; However, in reality, the mobile robot has reached a position $(xR_3, yR_3)$.

As described above, even though the course direction is determined, the position at which the mobile robot actually arrives a predetermined time later (e.g., 3×Δt later) is affected (i.e., changed) by the position and the movement of the target pedestrian, thus making it difficult to accurately calculate the position. Further, it consumes a large amount of computer resources and requires a long calculation time in order to acquire sensor data and process the acquired sensor data from moment to moment. Therefore, if the calculation is repeated at a high speed while recognizing the situation from moment to moment, the moving speed of the mobile robot 100 is lowered and the smooth movement is impaired. Therefore, in this embodiment, a trained model 251 is introduced. The trained model 251 outputs, upon receiving the own position of the mobile robot, and positions and velocity vectors of pedestrians, an estimated position at which the mobile robot is estimated to arrive a predetermined time later.

Firstly, an example of a learning process that is performed until a trained model 251 is generated will be described. In the learning, it is possible to adopt a method for automatically determining a movement of the mobile robot itself according to a predetermined algorithm without requiring an intervention by an operator. For example, it is possible to adopt an algorithm according to which one course direction is determined by calculating the one-dimensional potential described above with reference to FIG. 6 at each time point ($t=T_0$, $T_1$, $T_2$), and the mobile robot moves straight in that direction during a unit time $\Delta t$. According to the learning method that does not require an intervention of an operator, it is possible to generate a number of teacher data in a short time. However, it is also possible to adopt a method that involves an intervention of an operator. For the sake of understanding of the learning stage, a method that involves an intervention of an operator will be described hereinafter.

Figure 8:
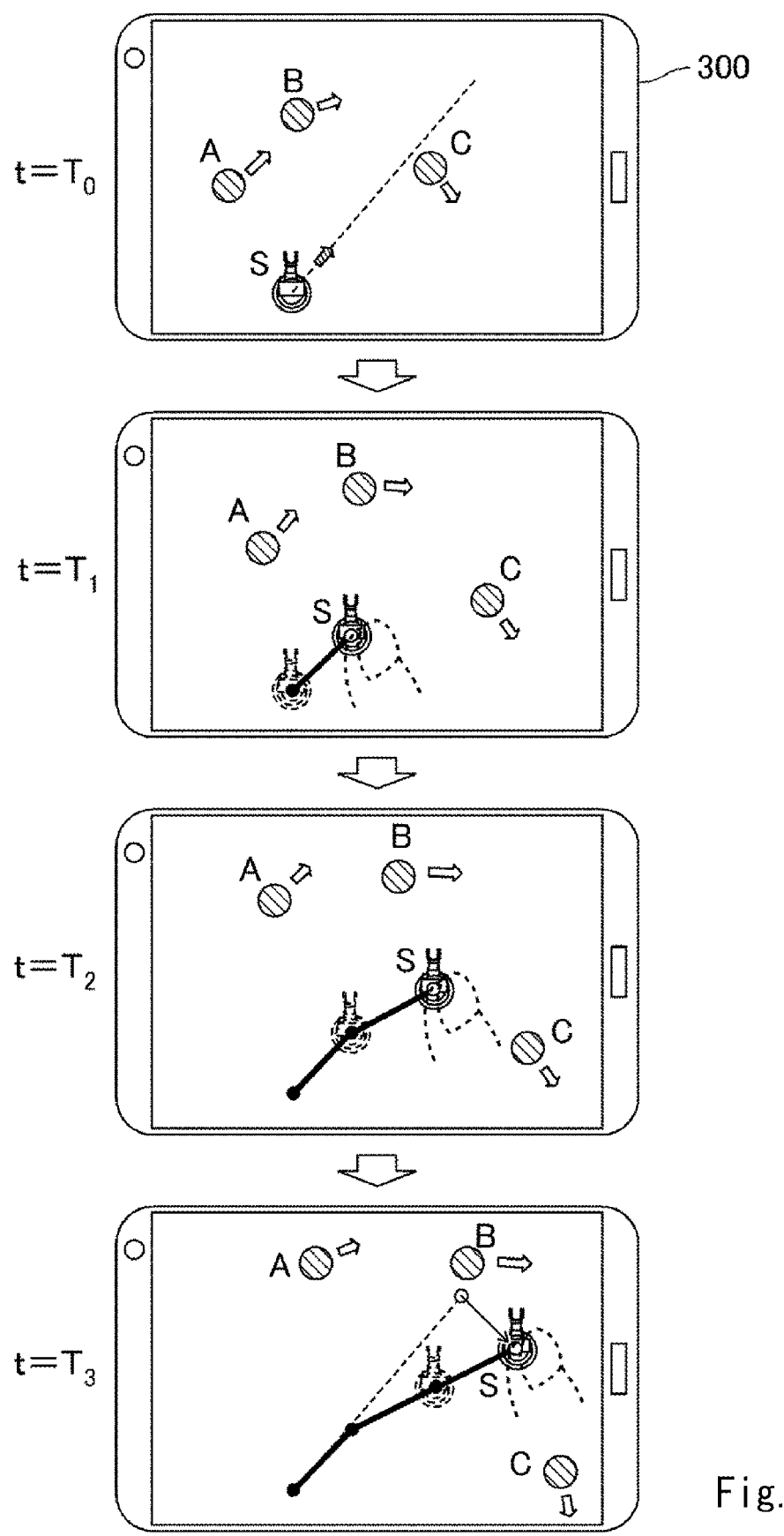
FIG. 8 shows a diagram for explaining a process for generating a trained model.

FIG. 8 shows a diagram for explaining a process for generating a trained model. Learning is carried out by performing simulations in which an operator inputs data or the like in a learning terminal 300, which is, for example, a tablet terminal. At an initial setting at a time $t=T_0$, a computer of the learning terminal 300 randomly positions a limited number of pedestrians (represented by pedestrians A to C in FIG. 8), and randomly sets their velocity vectors (represented by hollow arrows in FIG. 8). Further, the computer positions a mobile robot S itself (hereinafter also referred to as the own robot S) representing the mobile robot 100. One course direction, which is calculated for a relation between the pedestrians and the own robot, which are set as described above, is determined and a planned route corresponding thereto is indicated by a dotted line.

When a simulation is started, movements of the pedestrians A to C from a time $t=T_0$ to $T_1$ are shown in the form of animation by the computer. The movements of the pedestrians are randomly determined within a predetermined range of movement patterns. For example, the moving velocity is determined in a range of 0.8 to 1.5 m/s and the moving direction is periodically changed according to a set probability and a set angle. Further, when the own robot S enters a warning area at an immediately earlier time point, the own robot S may decelerate, stop, or start moving in a direction opposite to the entering direction. Further, when the own robot moves closer to the traveling direction of a pedestrian, it lowers the moving speed thereof.

When the positions of the pedestrians A to C at the time $t=T_1$ are determined, the animation is temporarily stopped. Then, the operator observes the situation of the pedestrians A to C and drags, by using a touch panel function, the own robot S (i.e., a symbol representing the own robot S) to a position to which the own robot S should move. The movement in this operation is restricted in accordance with the expected performance (or the intended performance) of the mobile robot 100. Further, dragging in a direction that widely deviates from the planned route is canceled. In this way, the operator determines the position of the own robot S at the time $t=T_1$.

The above-described process is repeated for each of the time $t=T_1$ to $T_2$ and the time $t=T_2$ to $T_3$. When the predetermined time is set to $3 \times \Delta t$, the position of the own robot S determined at the time $t=T_3$ becomes an estimated position for the initial setting at the time $t=T_0$. That is, a combination of the initial setting at the time $t=T_0$ and the position of the own robot S determined by the operator constitutes one teacher data.

A large amount of teacher data created by the operator is provided to the trained model 251, so that the trained model 251 is trained. The trained model 251 generated as described above is sent from the learning terminal 300 to the memory 250 through a server (not shown) and thereby stored in the memory 250. Note that the predetermined time may be set, for example, to a length of time that is short enough so that the movement of the target pedestrian detected by the detection unit 202 does not affect the movement of the mobile robot 100. Further, the predetermined time may be adjusted in accordance with the environment in which the mobile robot 100 autonomously moves. For example, the predetermined time may be shortened in an environment in which the moving velocities of pedestrians are high (e.g., in a concourse in a train station), and may be increased in an environment in which the moving velocities of pedestrians are low (e.g., in a welfare facility). Further, the movement patterns for pedestrians used in the simulation may be adjusted according to the environment in which the mobile robot 100 autonomously moves.

The second arithmetic unit 204 reads the trained model 251, which has been trained by using the above-described teacher data, from the memory 250 and uses the read trained model 251. Specifically, the second arithmetic unit 204 inputs information about the own position (i.e., the position of the mobile robot) received from the determination unit 201, information about the positions and the velocity vectors of pedestrians received from the detection unit 202, and the course direction received from the first arithmetic unit 203 into the trained model 251, and thereby calculates an estimated position of the mobile robot 100 after a predetermined time. The estimated position may be represented by coordinates relative to the input own position, or may be represented by an amount of a deviation from the original position, i.e., the position where the mobile robot would reach when it moves straight in the course direction.

Figure 9:
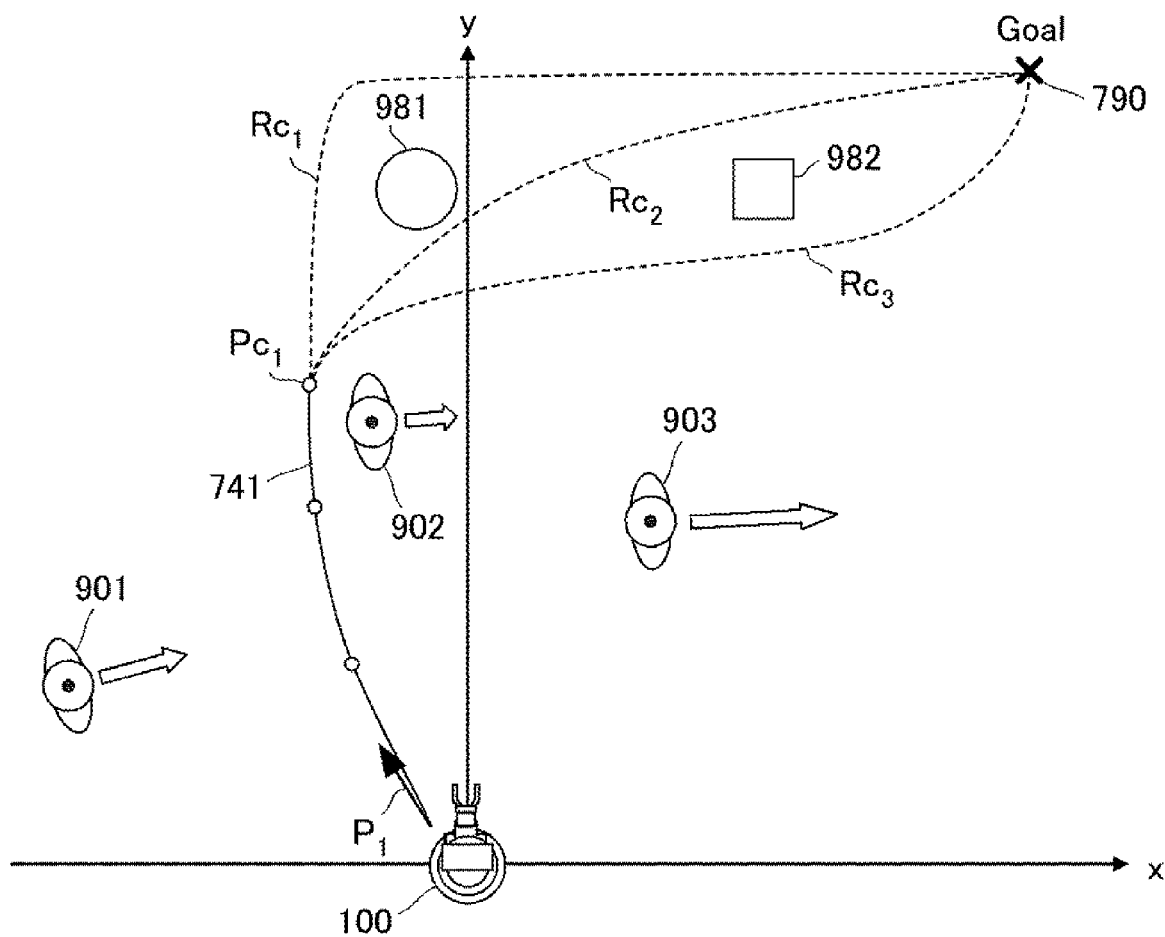
FIG. 9 shows a diagram for explaining a process for generating a remaining route.

The generation unit 205 receives information about the estimated position calculated by the second arithmetic unit 204 and generates a remaining route from the estimated position to the destination 790. FIG. 9 shows a diagram for explaining a process for generating a remaining route. A white circle Pc1 indicates an estimated position after a predetermined time has elapsed in the case where a black arrow P1 is adopted as the course direction. An estimated route 741 is not obtained as a direct output of the trained model 251, but represents a trajectory along which the mobile robot 100 is expected to travel.

In the environmental map 252, it is shown that obstacles 981 and 982 are present in an area between the estimated position Pc1 and the destination 790. As a route to reach the destination 790 while avoiding the obstacles 981 and 982, for example, candidates $Rc_1$, $Rc_2$ and $Rc_3$ are found as shown in FIG. 9. Among these candidates, a route having the smallest route cost is determined as the remaining route. For the search and the evaluation of a route, for example, an A* Search Algorithm may be used.

Figure 10:
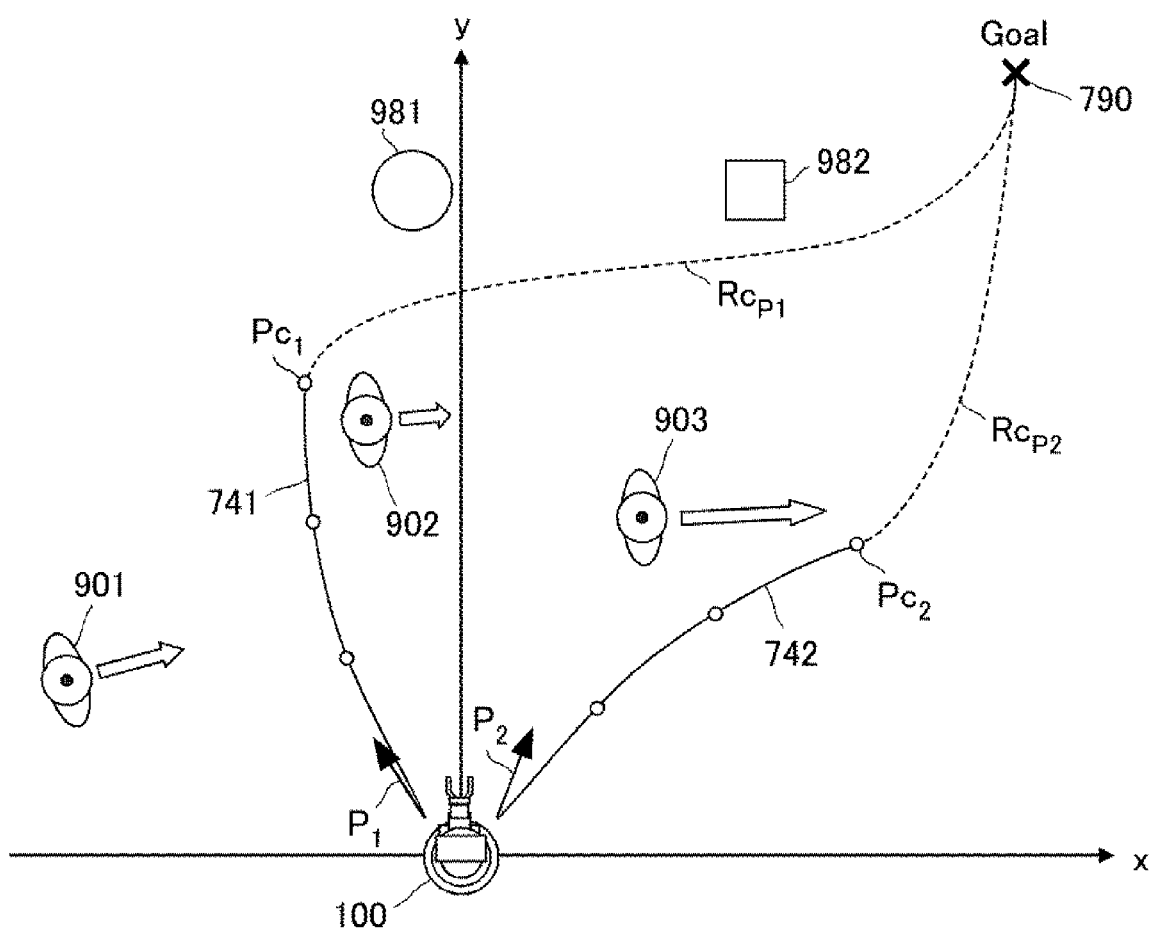
FIG. 10 shows a diagram for explaining a process for generating a remaining route according to another example.

When the first arithmetic unit 203 outputs a plurality of candidates for the course direction, the second arithmetic unit 204 calculates, for each of the plurality of course directions, an estimated position after the predetermined time has elapsed. FIG. 10 shows a diagram for explaining a process for generating a remaining route in the case where two candidates for the course are calculated.

Similarly to FIG. 9, a white circle Pc1 indicates an estimated position after the predetermined time has elapsed in the case where a black arrow P1 is adopted as the course direction, and an estimated route 741 indicates a trajectory along which the mobile robot 100 is expected to travel. A white circle Pc2 indicates an estimated position after the predetermined time has elapsed in the case where a black arrow P2 is adopted as the course direction, and an estimated route 742 indicates a trajectory along which the mobile robot 100 is expected to travel.

A candidate route $Rc_{p1}$ from the estimated position $Pc_1$ to the destination 790 is generated by, for example, an A* Search Algorithm as described above. Similarly, a route $Rc_{p2}$, which is a candidate route from the estimated position $Pc_2$ to the destination 790, is also generated by the A* Search Algorithm. Further, the generation unit 205 calculates a route cost in the case where the mobile robot moves to the destination 790 along the candidate route $Rc_{p1}$ via the estimated position $Pc_1$ by adopting the arrow $P_1$ as the course direction, and a route cost in the case where the mobile robot moves to the destination 790 along the candidate route $Rc_{p2}$ via the estimated position $Pc_2$ by adopting the arrow $P_2$ as the course direction.

The generation unit 205 generates an estimated route 741 based on the output of the second arithmetic unit 204 when the course direction $P_1$ is selected. Similarly, the generation unit 205 generates an estimated route 742 by selecting the course direction $P_2$. Then, for each of the case where the mobile robot travels along the estimated route 741 and the candidate route $Rc_{p1}$ and the case where the mobile robot travels along the estimated route 742 and the candidate route $Rc_{p2}$, the generation unit 205 calculates a route cost by using the moving distance, the moving time, the frequency of changes of the course, the degree of closeness to the obstacle, and the like as evaluation items. The generation unit 205 determines a candidate route having a lower route cost as the remaining route which is passed to the movement control unit 206.

By configuring the trained model 251 so as to output an estimated position and also output a degree of closeness to the pedestrian, i.e., how close the mobile robot moves to the pedestrian before the mobile robot reaches the estimated position, the degree of closeness can also be adopted as an evaluation item. For example, the number of times of crossing a warning area of the pedestrian can be used as the degree of closeness. In this case, the greater the degree of closeness, the higher the cost is set. By adopting such a parameter as an evaluation item, it is possible to determine the route while adjusting the balance between intimidation given to the pedestrian and the efficient movement.

The movement control unit 206 drives the movable-base drive unit 210 based on the information about the remaining route received from the generation unit 205 and one of the course directions received from the first arithmetic unit 203 that corresponds to the received remaining route. Specifically, the movement control unit 206 starts moving the mobile robot in the course direction and continues to move it while avoiding the pedestrian according to the information about the position and the velocity vector of the pedestrian which the movement control unit 206 periodically receives from the detection unit 202. Then, after the predetermined time has elapsed, the mobile robot moves along the remaining route. Note that in the selection of a remaining route described above with reference to FIGS. 9 and 10, the evaluation calculation is performed based on the route cost. However, the evaluation calculation may be performed by using other evaluation parameters.

Figure 11:
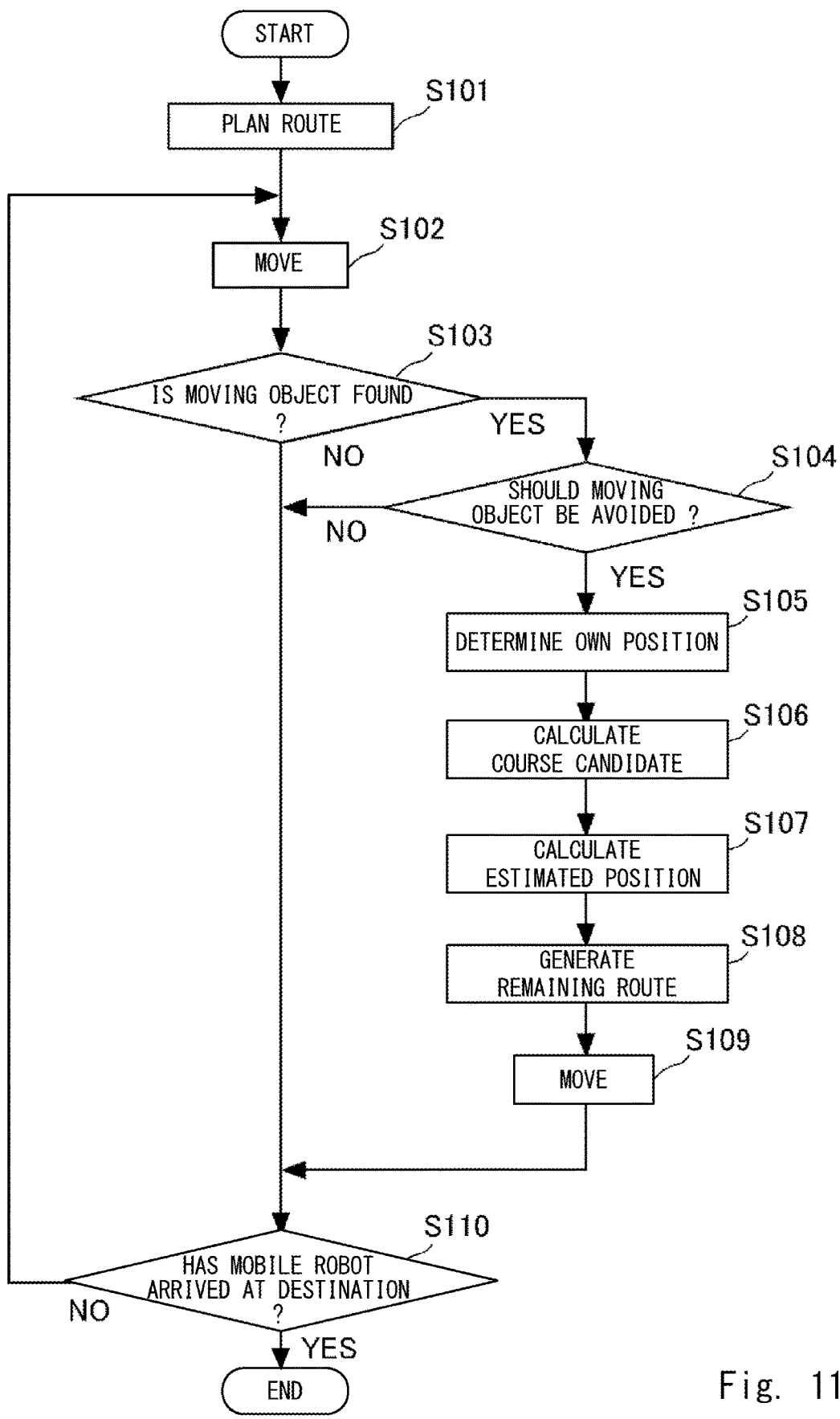
FIG. 11 is a flow diagram showing a flow of processes for an autonomous movement.

FIG. 11 is a flow diagram showing a flow of processes for an autonomous movement. The flow starts when a destination is set according to a task. Note that processes other than those related to the autonomous movement are not mentioned here. However, such processes are also performed as appropriate when necessary.

In a step S101, the control unit 160 plans a moving route from the current place to the set destination with reference to the environment map 252 read from the memory 250. That is, the planned route 700 shown in FIG. 4 is established. In a step S102, the movement control unit 206 moves the mobile robot 100 along the planned route. While the movement control unit 206 is performing the movement control, the detection unit 202 acquires the output of the sensor unit 130 and checks the presence/absence of a moving object that moves in the vicinity of the mobile robot at regular intervals (step S103). Unless the mobile robot finds a moving object moving in the vicinity of the mobile robot (step S103: No), it continues to move until it reaches the destination (step S110: No→step S102). When the mobile robot determines that it has reached the destination, it finishes the process for the movement (step S110: Yes).

When the detection unit 202 detects a moving object during the movement (step S103: Yes), the process proceeds to a step S104, in which the detection unit 202 determines whether or not the detected moving object is an object that the mobile robot should avoid (i.e., should steer around). Specifically, the detection unit 202 determines, as an object that the mobile robot should avoid, a moving object that is present in a local area set in the traveling direction of the own robot and has a velocity vector at which the moving object will not goes out of the local area within a certain time. When there is no moving object to be avoided, the process proceeds to a step S110. When there is a moving object to be avoided, the process proceeds to a step S105.

In the step S105, the determination unit 201 determines the position of the own robot by comparing the output of the sensor unit 130 with the environmental map 252 read from the memory 250. In a step S106, the first arithmetic unit 203 obtains information about the position of the own robot and information about positions and velocity vectors of moving objects, and calculates candidates for the course direction in which the own robot should travel. In a step S107, the second arithmetic unit 204 inputs the information about the position of the own robot, the information about the positions and the velocity vectors of the moving objects, and the candidates for the course direction in which the own robot should travel into the trained model 251, and thereby calculates an estimated position at which the mobile robot 100 is estimated to arrive a predetermined time later.

In a step S108, the generation unit 205 generates a remaining route from the estimated position to the destination. When information about a plurality of estimated positions is obtained, the generation unit 205 generates a remaining route for each of the plurality of estimated positions. When a plurality of remaining routes are generated, one remaining route is determined (i.e., selected) by performing evaluation calculation for each of the plurality of remaining routes.

In a step S109, the movement control unit 206 obtains information about the determined remaining route, the course direction corresponding to the remaining route, and the positions and the velocity vectors of the moving objects, and moves the mobile robot 100 by controlling the movable-base drive unit 210 based on the obtained information. Specifically, the mobile robot starts moving in the obtained course direction, and continues traveling while avoiding pedestrians based on the information about the positions and the velocity vectors of the pedestrians until a predetermined time, for which the estimated position has been calculated, has elapsed. Then, after the predetermined time has elapsed, the mobile robot performs movement control so as to move along the remaining route. After that, the process proceeds to a step S110, in which the movement control unit 206 determines whether or not the mobile robot has reached the destination. When the movement control unit 206 determines that the mobile robot has not reached the destination, the process returns to the step S102. When the movement control unit 206 determines that the mobile robot has reached the destination, it finishes the series of processes.

The above-described mobile robot 100 according to this embodiment calculates, when it detects a moving object to be avoided, an estimated position that the mobile robot will reach after a predetermined time has elapsed, and concentrates its efforts on avoiding the moving object while maintaining the determined course direction as much as possible until the predetermined time elapses. In addition, since the estimated position is calculated by using the trained model 251, the calculation speed is high. Therefore, there is no need to continuously update the route to the destination from moment to moment and hence the mobile robot can smoothly and speedily move to the destination. However, in the case where the mobile robot detects a moving object that was not recognized at the time when the estimated position was calculated and may possibly collide with the mobile robot before the predetermined time elapses, it may update the course direction, the estimated position, and the remaining route by calculating them again. The conditions for recalculating the course direction, the estimated position, and the remaining route are adjusted and set in advance according to, for example, the environment in which the mobile robot 100 is used.

Further, in this embodiment described above, as described above with reference to FIG. 6, when the course direction is determined, both the set $H^{obs}$ that is obtained while paying attention to the gap between moving objects and the set $H_{vel}$ that is obtained while paying attention to the following movement to the moving objects are used as candidates. That is, the first arithmetic unit 203 calculates the course direction based on an evaluation function that includes a fact that the distance from the moving object is long and a fact that the mobile robot follows the moving direction of the moving object as evaluation items. By adopting both of them as evaluation items, it is possible to adopt, for the moving object to be avoided, not only the direction in which the mobile robot is away from the moving object to be avoided, but also the direction in which the mobile robot follows the movement of the moving object. Therefore, it is possible to generate a route in various manners. However, the course direction may be determined based on one of them. Further, when there is no candidate in one of them, a candidate may be selected from the other of them. In any case, the course direction may be determined while taking the direction to the destination into consideration. By selecting a direction close to the direction to the destination as the course direction, it is expected that the time required to arrive at the destination can be reduced.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous mobile robot comprising:
   a determination unit configured to determine an own position of the autonomous mobile robot;
   a detection unit configured to detect a moving-object position and a moving-object velocity vector of a moving object moving in the vicinity of the autonomous mobile robot;
   a first arithmetic unit configured to calculate a course direction based on the own position, the moving-object position, and the moving-object velocity vector, the course direction being a direction in which the autonomous mobile robot should travel;
   a second arithmetic unit configured to input the own position, the moving-object position, the moving-object velocity vector, and the course direction into a trained model and thereby calculate an estimated position, the trained model being a model that has been trained by learning performed by a simulation using a teacher, the estimated position being a position at which the autonomous mobile robot is estimated to arrive a predetermined time later without colliding with the moving object;
   a generation unit configured to generate, after the estimated position is calculated by the second arithmetic unit, a remaining route from the estimated position to a destination; and
   a movement control unit configured to control a movement to the destination based on the course direction and the remaining route.

2. The autonomous mobile robot according to claim 1, wherein the autonomous mobile robot updates the estimated position and the remaining route when the detection unit newly detects a moving object during the movement to the destination.

3. The autonomous mobile robot according to claim 1, wherein
   the first arithmetic unit calculates a plurality of candidate course directions,
   the second arithmetic unit calculates an estimated position for each of the plurality of course directions calculated by the first arithmetic unit, and
   the generation unit generates a remaining route for each of the plurality of estimated positions calculated by the second arithmetic unit, performs evaluation calculation for each of the generated remaining routes, and determines the course direction and the remaining route that are passed to the movement control unit.

4. The autonomous mobile robot according to claim 3, wherein
   the trained model also outputs a degree of closeness to the moving object during the movement along the route to the estimated position, and the generation unit performs the evaluation calculation by using the degree of closeness.

5. The autonomous mobile robot according to claim 1, wherein the first arithmetic unit calculates the course direction based on an evaluation function, the evaluation function including, as evaluation items, a fact that a distance from the moving object is a distance greater than a threshold and a fact that the autonomous mobile robot follows a moving direction of the moving object.

6. The autonomous mobile robot according to claim 5, wherein the first arithmetic unit calculates the course direction while taking a direction to the destination into consideration.

7. A non-transitory computer readable medium storing a control program for controlling an autonomous mobile robot, the control program causing a computer to execute:
  a detection step of detecting a moving-object position and a moving-object velocity vector of a moving object moving in the vicinity of the autonomous mobile robot;
  a determination step of determining an own position of the autonomous mobile robot when the moving object is detected in the detection step performed during a movement to a destination;
  a first calculation step of calculating a course direction based on the own position, the moving-object position, and the moving-object velocity vector, the course direction being a direction in which the autonomous mobile robot should travel;
  a second calculation step of inputting the own position, the moving-object position, the moving-object velocity vector, and the course direction into a trained model and thereby calculating an estimated position, the trained model being a model that has been trained by learning performed by a simulation using a teacher, the estimated position being a position at which the autonomous mobile robot is estimated to arrive a predetermined time later without colliding with the moving object;
  a generating step of generating, after the estimated position is calculated, a remaining route from the estimated position to the destination; and
  a movement control step of controlling the movement to the destination based on the course direction and the remaining route.

8. A method for controlling an autonomous mobile robot performed by using a computer, the method comprising:
  a detection step of detecting a moving-object position and a moving-object velocity vector of a moving object moving in the vicinity of the autonomous mobile robot;
  a determination step of determining an own position of the autonomous mobile robot when the moving object is detected in the detection step performed during a movement to a destination;
  a first calculation step of calculating a course direction based on the own position, the moving-object position, and the moving-object velocity vector, the course direction being a direction in which the autonomous mobile robot should travel;
  a second calculation step of inputting the own position, the moving-object position, the moving-object velocity vector, and the course direction into a trained model and thereby calculating an estimated position, the trained model being a model that has been trained by learning performed by a simulation using a teacher, the estimated position being a position at which the autonomous mobile robot is estimated to arrive a predetermined time later without colliding with the moving object;
  a generating step of generating, after the estimated position is calculated, a remaining route from the estimated position to the destination; and
  a movement control step of controlling the movement to the destination based on the course direction and the remaining route.

* * * * *